(12) United States Patent
Bangs et al.

(10) Patent No.: US 11,240,404 B2
(45) Date of Patent: Feb. 1, 2022

(54) SYSTEMS AND METHODS FOR SYNCHRONIZING SENSOR CAPTURE

(71) Applicant: Woven Planet North America, Inc., Los Altos, CA (US)

(72) Inventors: Corey Frederick Bangs, Cupertino, CA (US); Forrest Samuel Briggs, Palo Alto, CA (US); George James Hansel, Redwood City, CA (US); James Allen-White Hoffacker, San Carlos, CA (US); Dhruv Lamba, San Mateo, CA (US); Chi Hoon Lee, San Francisco, CA (US); Yi Lu, San Jose, CA (US); Brian Thomas McGinn, Burlingame, CA (US); Phillip Sawbridge, Los Altos, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 0 days.

(21) Appl. No.: 17/199,271

(22) Filed: Mar. 11, 2021

(65) Prior Publication Data

US 2021/0274064 A1 Sep. 2, 2021

Related U.S. Application Data

(63) Continuation of application No. 16/298,503, filed on Mar. 11, 2019, now Pat. No. 10,972,637.

(60) Provisional application No. 62/642,526, filed on Mar. 13, 2018.

(51) Int. Cl.
*H04N 5/232* (2006.01)
*H04N 5/06* (2006.01)
*H04N 5/247* (2006.01)

(52) U.S. Cl.
CPC .......... *H04N 5/06* (2013.01); *H04N 5/23203* (2013.01); *H04N 5/247* (2013.01)

(58) Field of Classification Search
None
See application file for complete search history.

(56) References Cited

U.S. PATENT DOCUMENTS

| 2013/0278728 | A1* | 10/2013 | Gong | ............ H04N 21/8547 348/47 |
| 2017/0150236 | A1* | 5/2017 | Newman | ................. H04N 5/247 |
| 2017/0332131 | A1* | 11/2017 | Opsenica | ................. H04L 43/04 |

* cited by examiner

*Primary Examiner* — Gary C Vieaux
(74) *Attorney, Agent, or Firm* — Christopher G. Darrow; Darrow Mustafa PC

(57) ABSTRACT

In one embodiment, a method includes, by a computing device of a first sensor receiving synchronization information from a controller. The synchronization information being generated based on a clock of the controller. The method also includes determining, based on the synchronization information, a first offset between a first clock of the first sensor and the clock of the controller; storing the first offset; and synchronizing, based on the stored first offset and the first clock of the first sensor, a first data capture by the first sensor with a second data capture by a second sensor. The first data capture and the second data capture being requested by the controller.

20 Claims, 6 Drawing Sheets

SYSTEMS AND METHODS FOR SYNCHRONIZING SENSOR CAPTURE

PRIORITY

This application claims priority under 35 U.S.C. § 120 to U.S. patent application Ser. No. 16/298,503, filed 11 Mar. 2019, which is a non-provisional patent application of U.S. Provisional Patent Application No. 62/642,526, filed 13 Mar. 2018, all of which is incorporated herein by reference.

BACKGROUND

Sensors (e.g., cameras, infrared sensors, LiDAR, etc.) are often used to capture information about an environment. Since the amount of information that needs to be captured may be beyond the capabilities of any one sensor, multiple sensors may be needed to capture all the desired information (e.g., multiple cameras may be needed to capture a 360-degree view of the surrounding). Especially since the environment could change over time, the sensors would need to capture information at the same instant to preserve correspondence between the captured information. Simultaneously-captured information may be used for stereo-depth computation, computer vision, sensor fusion applications, three-dimensional (3D) reconstruction of an external environment, autonomous navigation, etc. As an example and not by way of limitation, multi-camera systems may be used for robotics, assisted navigation of vehicles, generating virtual or augmented reality content, or industrial assembly. For these and other applications, the data captured by multiple sensors should be synchronized for the results to be accurate.

Synchronizing sensor capture, however, is not simple. For example, cameras could be triggered by a central controller that sends synchronization pulses simultaneously to each camera. Each camera may be configured to begin its exposure immediately upon receiving the pulse, so the simultaneity of the exposures corresponds to how simultaneously each camera received the pulse (which could be affected by cable length, noise, serialization/deserialization processes, etc.), plus the comparatively small but variable internal delay of the camera itself. While the cameras could all have cables of the same length connected to the central controller to minimize discrepancies between when the cameras receive the pulse, having so many wires may not always be practical or scalable. Especially in cases where space is limited (e.g., on an automobile), multi-camera systems may benefit from reducing the number of wires used. However, if the cameras share a single wire, the serialization and deserialization process could introduce jitter and contribute to timing discrepancies. In other words, the time offset when each camera receives the synch pulse may be caused by jitter from a serializer/deserializer used to multiplex signals between the cameras and the camera interface board. As such, even if the synchronization pulses are sent at the same instant, the cameras may not trigger their exposures at the same time.

Inaccurate sensor synchronization could have significant consequences. For example, a vehicle may be equipped with a variety of systems or modules for enabling it to determine its surroundings and provide assistance in navigation. In the case, generating accurate data or a three-dimensional model of the external environment is dependent on proper synchronization of the cameras. To maintain an accurate representation or model of the external environment, the cameras of the vehicle should capture the scene at the same time. However, the synchronization of image-capturing operations between the cameras is non-trivial. For cameras having a rolling shutter and operating at 1080p, the cameras should be synchronized within a line time (e.g., approximately hundreds of nanoseconds). Such stringent synchronization requirement may be difficult to achieve considering the amount of jitter in the serial, coaxial connection between a camera interface board and the cameras.

DESCRIPTION OF EXAMPLE EMBODIMENTS

Figure 1:
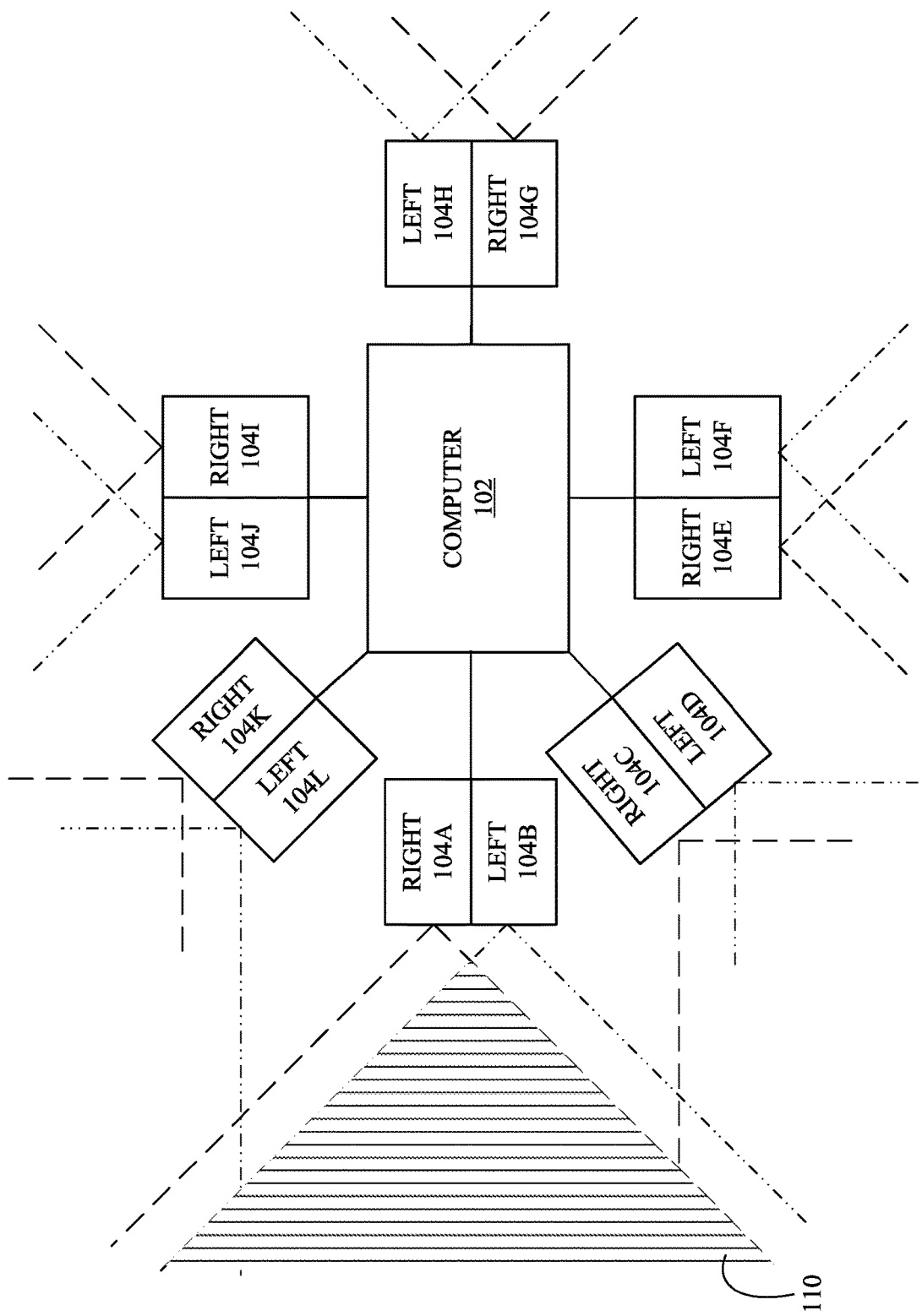
FIG. 1 illustrates an example array of stereo pairs of optical cameras in a camera system.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Many systems use multi-camera arrays in applications, such as for example stereo-depth computation, computer vision, sensor fusion applications, 3D reconstruction of an external environment, autonomous navigation, etc. As an example and not by way of limitation, multi-camera systems may be used by industrial robots to see and properly assemble objects on a factory floor. As another example, 3D augmented/virtual reality content is captured using a multi-camera stereoscopic system to generate 3D content for playback on a VR headset. In the case of vehicle navigation, a vehicle may include one or more sensors of various and complementary types to capture information of the external environment of the vehicle. Having accurate data or accurate 3D model of the external environment is dependent at least in part on achieving proper synchronization of the multiple cameras to accurately capture the scene in 3D. Accurate imaging in low light conditions may be managed using optical cameras operating in a high-dynamic range (HDR) image capture mode. HDR images reproduce a greater dynamic range of luminosity than is possible with standard imaging techniques.

In many applications, the size of each camera module should be minimized to keep the overall size of the multi-camera system to a minimum. The form factor of camera module dependent on number of cables and number of cable connectors. In a typical camera module, the image sensor may be connected to a camera interface board (CIB) through two serial, coaxial cables. One cable may be configured to transmit power, control signals (e.g., using $I^2C$ protocol), or timing signals to the image sensor, and the other coaxial cable to transmit image data (e.g., MIPI protocol) from the image sensor to the CIB. When the number of cables per camera is multiplied by the number of cameras in the sensor array, the space taken by the cables and the wiring complexities become non-negligible, especially given the limited space available on a vehicle. A significant reduction in the collective size of the cables may be achieved by multiplexing all signals between the image sensor and the CIB so that all signals may be transmitted or received using a single cable. While the single-cable solution may address the spatial problem with having an excessive number of cables, it introduces complications related to camera synchronization. For example, one complication with shutter timing is attributable to the latency introduced to the signal over the distance between the CIB and the image sensors (e.g., approximately 15 meters). In addition, the use of a serializer/deserializer in some implementations of a serial coaxial connection between the image sensor and CIB may introduce jitter, as discussed in more detail below.

Improperly synchronized image captures may negatively impact several down-stream applications that assume otherwise. For example, a computing system of the vehicle may use the time component (e.g., timestamp) of the pixels or line of pixels to reconstruct a real-time model of its external environment from the images of the stereo pairs of optical cameras. The model representing the environment at an instant in time would be inaccurate if the underlying data (e.g., the captured images) do not capture the environment at the same instant. Especially for a platform (e.g., a vehicle) traveling at high speeds, slight differences in capturing times may result in significant differences between what is captured and what should have been captured.

Furthermore, as described above, visual data is extracted from overlapping frames captured by using stereo pairs of optical cameras. Detected objects in each frame are correlated and mapped to each other, and the lateral shift of the objects in their respective images may be used to compute depth information of the object in the field of view (FOV). Therefore, for this depth information to be accurate, the overlapping frames should be captured at approximately the same time (e.g., within a line time for a rolling shutter image sensor). As described in more detail below, the precision in the synchronization time between stereo camera pairs may be limited by jitter introduced by serializer/deserializer circuits in the serial connection between the CIB and the cameras.

Particular embodiments described herein relate to maintaining or scheduling synchronization of image capture at a future time. Optical cameras are often triggered by CIB that sends synchronization or triggering pulses (canonically "strobes") simultaneously to each camera. Typically, each optical camera begins its "exposure" or image capture immediately upon receiving the pulse, so the simultaneity of the exposures corresponds to how simultaneously each optical camera received the pulse, plus the comparatively small but variable internal delay of the optical camera itself. Particular embodiments described herein relate to each optical camera and the CIB maintaining a synchronized clock through a forward or reverse channel. In particular embodiments, optical cameras may include a timing controller in communication with the CIB. Particular embodiments described herein are "asynchronous" because there is no notion of time or a clock on the optical camera. With zero fixed delay, the "jitter" of the i-th camera, denoted is the difference between the absolute time $t_s$ at which all cameras were supposed to start their exposure and the absolute time $t_{ai}$ at which the exposure actually began for the i-th camera. In a strobed system $T_i$ is the sum of the camera's internal jitter and the strobe channel jitter. The jitter is constructed to be random and zero mean, with an assumed constant average delay.

The embodiments descried herein for synchronizing sensory capture may be applicable in a variety of contexts. For example, FIG. 1 illustrates an example array of stereo pairs of optical cameras (e.g., camera pairs 104A-B, 104C-D, 104E-F, 104G-H, 104I-J, and 104K-L) in a camera system coupled to a computer 102. Each stereo pair of optical cameras (e.g., cameras 104A and 104B) may have an overlapping field of view (FOV) 110. As shown in FIG. 1, the cameras 104A-L may be configured to capture a 360° view of the surrounding environment. As described in more detail below, each camera (e.g., 104A) may include an image sensor that is configured to capture individual photo images or a series of images as a video. The left camera (e.g., 104B) and the right camera (e.g., 104A) of the stereo pair having approximately parallel orientations may represent a stereo pair that is oriented in the same direction, and these cameras (e.g., 104A and 104B) may be referred to as having the same orientation. In particular embodiments, left camera (e.g., 104B) and right camera (104A) having a same orientation may have orientations that are parallel to one another to within ±0.1°, ±0.5°, ±1°, ±2°, ±3°, or to within any suitable angular value.

Figure 2:
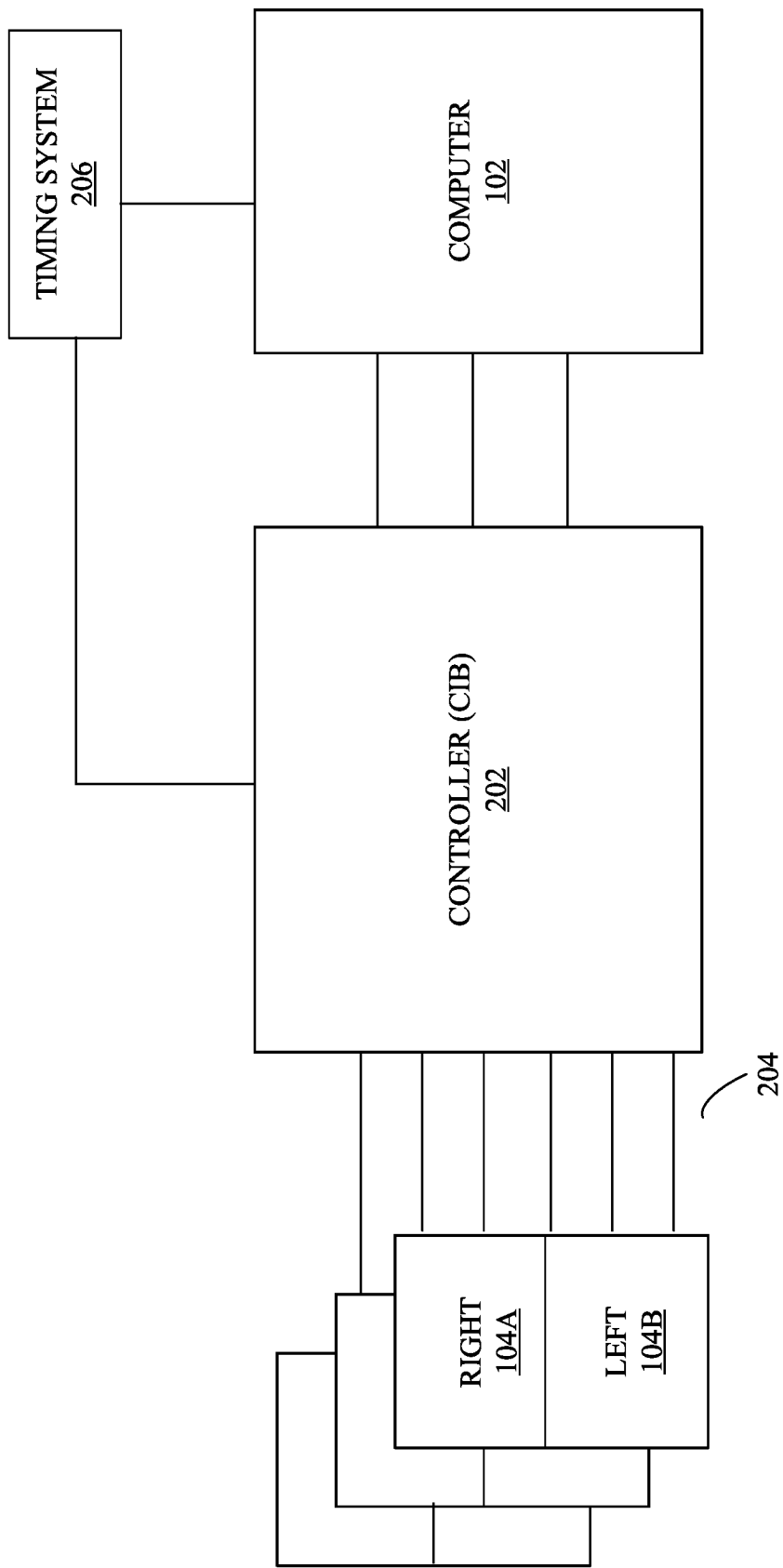
FIG. 2 illustrates an example schematic of a camera system.

FIG. 2 illustrates an example schematic of a camera system. As illustrated in the example of FIG. 2, each optical camera (104A and 104B) may be connected to a camera interface board (CIB) 202 through a respective power over coax (PoC) serial link 204. CIB 202 may be mounted as part of the sensor array (e.g., inside or outside of a vehicle). Further, CIB 202 may multiplex power, timing (synchronization), and control (e.g., $I^2C$) signals sent to respective camera (e.g., 104B) and video data (e.g., MIPI) received from the respective camera (e.g., 104B) through serial link (e.g., 204). As described in more detail below, a timing system 206 that is coupled to CIB 202 distributes a set of synchronization (synch) or trigger pulses to each camera (e.g., 104A and 104B) through serial link 204. Each trigger pulse initiates an image capture by the respective camera (e.g., 104A and 104B). Further, timing system 206 is coupled to computer 102 and provides timestamp information of the video feed that is captured by stereo pairs. In particular embodiments, computer 102 interfaces with other systems and may control the function of one or more other systems. Although this disclosure describes and illustrates a particular camera system having a particular configuration of components, this disclosure contemplates any suitable camera system having any suitable configuration of components.

Figure 3:
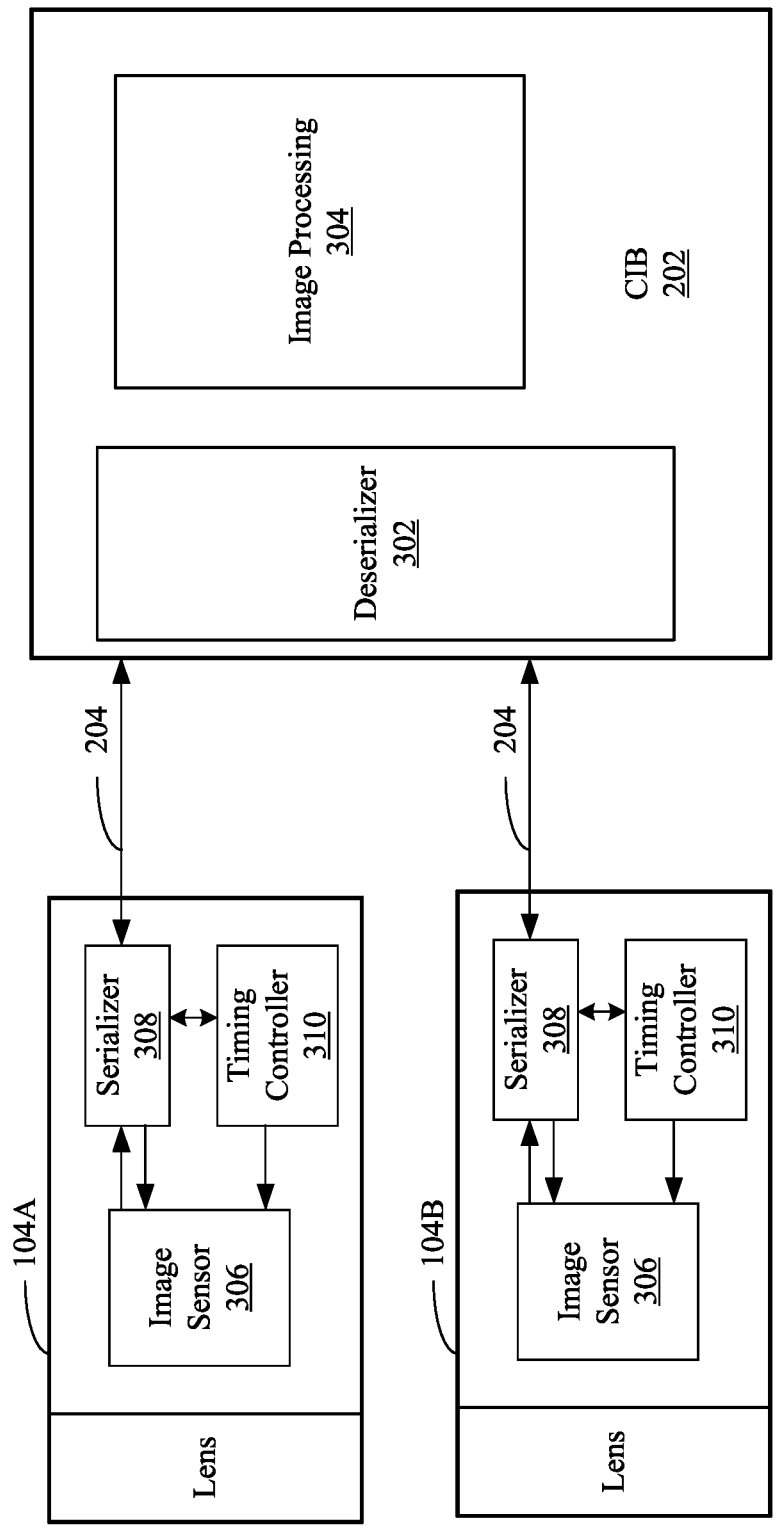
FIG. 3 illustrates a schematic of an example camera interface board.

As previously described, in "asynchronous" strobe systems where pulses are sent to cameras to trigger capture, the cameras may not capture synchronously due to jitter. Instead of an asynchronous scheme, embodiments described herein may have each camera and the central controller maintain a synchronized clock to help synchronize captures. FIG. 3 illustrates a schematic of an example camera interface board 202 connected to two of the cameras 104A-B. As illustrated in the example of FIG. 3, CIB 202 includes a deserializer 302 and an image processing system on a chip (SOC) 304. The CIB 202 may receive timing data (e.g., one or more trigger pulses) from a timing generator and provides control data to deserializer 302. In particular embodiments, communication between CIB 202 and cameras 104A and 104B is performed over serial coax connection 204 through serializer 308 and deserializer 302. Cameras 140A and 140B may each include an image sensor 306, serializer 308, and a timing controller 310 (e.g., fully-programmable gate array (FPGA)). Serializer 308 is coupled to deserializer 302 of CIB 202 through serial coax connection 240, described in more detail above. The use of the serializer 308/deserializer 302 pair provides an ability to multiplex the power, timing, control and video signals from CIB 202 to each camera (e.g., 104A and 104B) over serial link 204. In particular embodiments, each serializer 308/deserializer 302 pair may include a control channel (e.g., forward and reverse channel) that may be used to send data to or from CIB 202 and each camera (e.g., 104A and 104B), as described below in more detail.

In particular embodiments, image sensor 306 may be operating in a rolling shutter mode, where an image is captured one line at a time rather than as an entire frame. In particular embodiments, the use of a rolling shutter allows for image sensor 306 to operate in the HDR mode for enhanced imaging in low-light situations since the pixels of the rolling shutter image sensors have higher light collection (higher fill factor) than frame capture image sensors. For stereo image reconstruction where corresponding pixels from each camera 104A and 104B are mapped in time, the image capture of the right 104A and left camera 104B of the stereo pair should be synchronized to within less than an order of a line time (e.g., approximately hundreds of nanoseconds) when operating in the rolling shutter mode. In this manner, the corresponding lines captured by the cameras would be associated with approximately the same time instant. In particular embodiments, even more precise synchronization of the image capture may enable the reconstruction of views based on the images captured by using 3 or more optical cameras. As described in more detail below, particular embodiments described herein may dispense with the use of a synchronization or trigger pulse from the timing system to trigger image capture and instead provide a future time for the stereo pairs of the sensor array to capture an image.

As illustrated in the example of FIG. 3, the timing controller 310 of each camera (e.g., 104A) receives timing data from CIB 202 through its corresponding serializer 308. In particular embodiments, timing controller 310 may include a clock that includes a clock source (e.g., a crystal or oscillator), a counter $c_i$ of the total number of clock cycles that have occurred in a given epoch (e.g., since power-on), and a synchronization table $S_i$ with one or more entries $S_{ij}$. In particular embodiments, each camera (e.g., camera 104A and 104B) and CIB 202 maintains a synchronized clock. As an example and not by way of limitation, the entries, $S_{ij}$, of the synchronization table may correspond to a function that transforms a local counter value $c_i$ or clock of camera i (e.g., camera 104A) into a counter value $c_1$ of a different camera j (e.g., 104B) or the clock of timing system 206. In this way, each camera (e.g., 104A) is able to estimate the offset from the counter value (the clock) of the other cameras (e.g., 104B) or timing system 206 coupled to CIB 202 based on its own counter value and the entries in its synchronization table. As an example and not by way of limitation, when camera i receives a counter value $c_1$ from camera j, camera i may lookup entry $S_{ij}$ in its synchronization table to determine the corresponding counter value $c_i$ as measured by its own clock. For example, if the entry in the synchronization table for camera 104A and CIB 202 indicates that the local clock of camera 104A has an offset that is 2 milliseconds slower than the timing of CIB 202 (from timing system 206), camera 104A may transform a counter value from the CIB into the camera's 104A own counter value by subtracting the received counter value by the equivalent of 2 milliseconds. Similarly, the other cameras (e.g., 104B) may use the relevant entry in its synchronization table to synchronize its clock to the timing of CIB 202. In this way, not only would each camera know its own counter value, it would also able to estimate the offset of the counter value of the other cameras or central controllers in its synchronization table.

The relative frequencies or phases of the clock sources of the distributed cameras 104A and 104B may vary over time. To compensate for this relative drift between distributed clocks, the local clocks of the different cameras (e.g., 104A and 104B) may regularly exchange information between themselves or the timing system to update their synchronization tables. The amount of time the synchronization table remains valid ("coherence time") may vary with temperature, vibration, or other environmental factors. In particular embodiments, the time between updates to the synchronization table should be smaller than the coherence time to maintain accurate synchronization between cameras 104A and 104B and timing system 206.

In particular embodiments, the synchronization table may be updated through communication of synchronization information from CIB 202 to each camera 104A and 104B (forward channel of the serial coax connection) and from each camera 104A and 104B to the CIB 202 (reverse channel of the serial coax connection). Bidirectional communication of synchronization information over these channels (forward and reverse) of the serial coax connection enable timing controller 310 to estimate an average signal delay, while frequency correction/nulling of jitter may be performed using one-way communication through either the forward channel or reverse channel of the serial coax connection. In particular embodiments, the forward channel and reverse channel may be active or passive. Herein, reference to an active channel refers to a channel that enables transmission of synchronization information (e.g., a specific sequence of symbols over the channel with some delay and jitter), whereas reference to a passive channel refers to a channel that enables the sharing of synchronization information between two endpoints without the choice of the synchronization information shared (functionally this resembles the endpoints as two receivers with a hidden, uncontrolled transmitter with active channels to both).

In particular embodiments, to update the synchronization table of each camera, a periodic pulse train on the forward channel may be used to transmit synchronization information from CIB 202 to the camera (e.g., 104B). Using the forward channel, CIB 202 may send a periodic series having a pre-determined number (N) of pulses. The effective jitter between the controller and the camera decreases by $1/\sqrt{N}$ so long as the jitter per pulse is independent. The pulses may be sent at an interval corresponding to a fixed incrementation of the clock counter associated with CIB 202. Each pulse arrives with a jitter corresponding to the jitter of the underlying channel (e.g. the synchronization information or forward channel of serializer 308). With its local counter, each camera (e.g., 104B) determines the duration and interval between the arriving (N) pulses, which are used to calculate the entries in the synchronization table. For example, (1) a quotient of the local timing value and the prearranged fixed incrementation of the clock counter associated with CIB 202, and (2) a quotient of the expected pulse length and the timed pulse length may be stored in the corresponding entry in the synchronization table (e.g., if j represents the CIB, the offset data may be stored in entry $S_{ij}$ in the synchronization table S of camera i). These synchronization table entries may be used to determine frequency and phase offsets. Any reverse channel may reflect the pulse train received from an associated forward channel, and CIB 202 may use the round-trip time to estimate and compensate for the average delay value. For example, if the CIB 202 wishes to trigger a synchronous capture amongst several sensors (e.g., cameras), it may determine a scheduled time at which all of the captures should occur. The scheduled time should be sufficiently far in the future for the cameras to receive the triggering pulses before the scheduled capture time. As such, the CIB 202 may compute the scheduled time based on the learned average signal delays between the CIB 202 and the cameras.

In particular embodiments, a coded-pulse train on the forward channel may be used to asynchronously transmit synchronization information from CIB 202 to each camera (e.g., 104B). On the forward channel, the controller transmits a k-indexed nonperiodic binary signal (a code) which may be broadband, where positive and negative edges of the sent pulses are uniformly distributed such that the narrowest pulse may be arbitrarily narrow and the longest pulse arbitrarily long, or bandlimited so after each time period the coded-pulse train is either high or low. Each camera (e.g., 104A) knows which code is expected, and correlates the incoming signal $C_{kinc}(t_{cam})$ with a finite number of versions of the code $C_{ktrue}(t)$ subject to $\xi$-indexed transformations $F(C(t), \xi)$. $C_{kinc}(t_{cam})$ is the code received at a particular camera (e.g., 104A) at time $t_{cam}$ as determined by the time of the local clock of the respective timing controller 310. $C_{ktrue}(t)$ is the various versions of the code based on the $\xi$-indexed transformations described in more detail below. The value of with the largest correlation corresponds to the values of the entries, $S_{ij}$, of the synchronization table. The $\xi$-indexed transformations include shifting (delay and phase offset): $F(C(t),\xi)=C(t-\xi)$, stretching (frequency offset): $F(C(t),\xi)=C(t\xi)$, non-uniform stretching (frequency drift): $F(C(t),\xi(t))=C(t\xi(t))$, projections into a basis $B_\xi(t)$ (Fourier transforms or other encodings): $F(C(t),\xi(t))=\int B_\xi(t) \times C(t) dt$.

The selection of k-index in the coded-pulse train on the forward channel is an indication to each camera (e.g., 104A) what CIB 202 clock counter value was at transmit time. The $\xi$-index tells the camera what the counter value of the respective camera (e.g., 104A) was at the time the coded-pulse train was received, and each camera (e.g., 104A) may use the reverse channel to transmit this value and its synchronization table entries $S_{ij}$ to CIB 202. CIB 202 may use the round-trip time to estimate and compensate for an average delay value (from sending the coded-pulse train to when the coded-pulse train was received by each camera), so that each camera (e.g., 104A) and the CIB 202 have accurate synchronization tables reflecting the respective amount of jitter associated with the serial, coaxial connection to each camera (e.g., 104A), which may be used to adjust the value of the local clock of each camera.

Particular embodiments may dispense with the use of trigger pulses to trigger image capture. A trigger schedule or future time for image capture may be sent over the forward channel asynchronously. In particular embodiments, a code function is selected to minimize synchronization error. A random code such as a Gold code or Kasami code may be more suitable than the periodic pulse train, described in more detail above, because the periodic pulse train is susceptible to jitter that may be correlated with itself over time, whereas a random distribution of pulse edges randomizes any time-correlated jitter. Randomizing the time-correlated jitter mitigates the effect of jitter on synchronizing the image capture between cameras (e.g., 104A and 104B). In particular embodiments, codes may be selected to be longer or shorter depending on how frequently synchronization of the synchronization tables is required based on the coherence time. As an example and not by way of limitation, chirped codes, which have time-dependent frequency content, may be selected so that each camera (e.g., 104A) alone may make a variable tradeoff between synchronization accuracy and energy required to compute the correlations, or simultaneously compute the values of total delay and frequency offset.

In particular embodiments, a future time t for one or more cameras (e.g., 104A) to capture an image may be encoded in a pulse train sent by CIB 202. As an example and not by way of limitation, this future time may be encoded as a number having a pre-determined number of bits (e.g., 64). As described in more detail above, the jitter associated with the pulse train decreases as decreases by $1/\sqrt{N}$, mitigating the effect of jitter on synchronizing the image capture between cameras (e.g., 104A and 104B). Therefore, for a pulse training having a large enough number of bits, the exact time the signal is received by the time does not matter as long as the coded-pulse train is received before the future time t. In particular embodiments, timing controller 310 of each camera (e.g., 104A and 104B) is waiting to detect the particular random sequence of pulses and may compare the received coded-pulse train to a stored copy of the pulse train. Cameras (e.g., 104A and 104B) may initiate image capture a pre-determined amount of time after the coded pulse is received based on a match between the stored copy of the pulse train and the received pulse train.

In particular embodiments, a correlator of timing controller 310 may compare versions of the stored coded-pulse train that is shifted in time and multiply these time-shifted pulse train to the received coded-pulse train. The amount of correlation between the stored and received pulse trains is low until there is zero-time offset between a particular shifted pulse train and the received pulse train. In particular embodiments, the amount of time shifting that maximizes the product (maximizes the correlation) between the stored and received pulse trains corresponds to the fixed amount of time (e.g., 2 milliseconds) to capture an image. Cameras (e.g., 104A and 104B) receiving this signal may initiate image capture a pre-determined amount of time after the fixed amount of time.

Image steganography may be used as a reverse channel for synchronization information. In particular embodiments, synchronization information between CIB 202 and one or more cameras (e.g., 104A) may be embedded in a captured image with no additional delay. As an example and not by way of limitation, a code, as described above in more detail, may additively superposed the data of the synchronization table on to the captured image data. CIB 202 may correlate the captured image to recover the code, use the encoded value to update its synchronization table entries $S_{ij}$, and subtracts the code from the captured image data.

Synchronization information may be shared using flicker mitigation hardware in cameras (e.g., 104A and 104B) as a passive-reverse channel or passive-forward channel for synchronization data. In particular embodiments, cameras (e.g., 104A) may use high-frequency (in the time domain) content in their image fields as a fundamental synchronization source. CIB 202 is able to trigger multiple cameras (e.g., 104A and 104B) simultaneously without having to determine its own time offset. As an example and not by way of limitation, many light sources (e.g., light emitting diodes (LEDs)) flicker on and off quickly for dimming purposes or as part of their intrinsic function. The temporal phase of this flicker combines with the spatiotemporal phase of the rolling shutter in a way that uniquely identifies the relative phase of the rolling shutter and the flicker source. To compensate and present images that look normal, image sensors may insert an additional exposure to capture the flickering light source when it is on, so that the image contains minimal information about the flicker phase. In particular embodiments, one or more cameras (e.g, 104A and 104B) may use its local clock (e.g., timing controller 310) to timestamp a primary shutter time and an anti-flicker shutter time per line of exposure. The sequence of timestamps may be transmitted over a reverse channel to CIB 202. CIB 202 may cross-correlate the timestamps as a function of the line of image sensor 306 (for rolling shutter operation) across different cameras having at least partially overlapping FOVs (e.g., 104A and 104B). As an example and not by way of limitation, the cross-correlation matches up pixels or lines of pixels received from cameras 104A and 104B with the same timestamp and uses this data to reconstruct the external environment in 3D. CIB 202 may use cross-correlated timestamps to extract the relative frequency and delay offsets between cameras (e.g., 104A and 104B). CIB 202 may accept the clock of one of the cameras (e.g., 104B) as a master clock to calculate and sends synchronization table entries $S_{ij}$ to the different cameras (e.g., 104A and 104B) and a trigger schedule or future time to capture an image asynchronously.

In particular embodiments, image sensor 306 may not be equipped with an anti-flicker shutter, so there is a temporal flicker pattern corresponding to the frequency and delay offsets of the cameras (e.g., 104A and 104B) spatially encoded in the captured images. In this case, the image data sent to CIB 202 may be used as a reverse channel. As described in more detail above, CIB 202 may cross-correlate the image across cameras with overlapping FOVs (e.g., 104A and 104B) data based on the timestamp associated with the image data and send corrections of synchronization table entries $S_{ij}$ and a trigger schedule over a forward channel to the appropriate cameras (e.g., 104A and 104B), which may be performed asynchronously.

Figure 4:
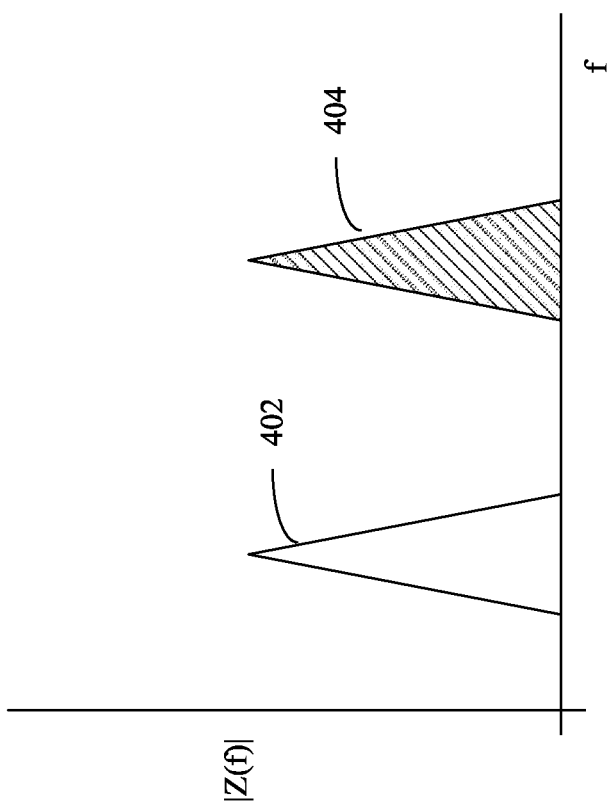
FIG. 4 illustrates an example frequency diagram for a main channel and timing channel.

FIG. 4 illustrates an example frequency diagram for a main channel and timing channel. The forward channel and reverse channel of the serial coax connection used to transmit synchronization data are typically tuned to operate at a specific fundamental frequency, such as 1 or 2 GHz for example, over which both data and control data are multiplexed using a high-speed serial protocol, as described in more detail above. In particular embodiments, communication between CIB 202 and cameras (e.g., 104A and 104B) is performed using a dual (frequency) band duplex channel, where a timing channel 402 is sufficiently separated from the main communication (video/control) channel 404 in the frequency domain, as illustrated in the example of FIG. 4. Timing channel 402 may be used to provide the forward channel and reverse channel of the serial coax connection described in more detail above. In particular embodiments, the spectrum of timing channel 402 and main channel 404 are band-limited so as to not interfere with each other. The use of timing channel 402 may significantly lower jitter because timing channel 402 is reserved for CIB communication and therefore allows the CIB to issue commands (e.g., trigger pulses or synchronization information) when desired without the command signals being delayed due to serialization. In particular embodiments, a modulator and demodulators at the endpoints of the channels 402 and 404 may have bandpass filters that are individually matched to a frequency of operation of main communication channel 404 as well as a frequency of operation of timing channel 402.

As described in more detail above, the synchronization table of the timing controller and camera should be periodically updated. The drift of each clock is proportional to temperature. The clocks of the timing controllers may drift relative to each other and from the clock of the CIB faster at higher temperatures. Therefore, the synchronization table will need to be updated more frequently at higher temperatures in order to maintain a particular synchronization quality (lower coherence time). In particular embodiments, image noise quantity may be used to compensate for temperature effects. Noise in a captured image is proportional to temperature allowing for use of a proportional controller on the interval between synchronization events $\tau_{sync}$. A luminance or chrominance histogram of the image with the frequency of the ith bin denoted as $\lambda_i$, where i ranges between 0 to the $i_{max}$, where $i_{max}$ is the value of i where the highest luminance or chrominance value is present in the image, is constructed. For the lowest-exposed k bins, renormalize their frequencies $\lambda_i$ such that:

$$1 = \sum_{i \in [0,k]} \bar{\lambda}_i$$

Then, the following may be computed with the renormalized frequencies:

$$H = \sum_{i \in [0,k]} \bar{\lambda}_i \log \bar{\lambda}_i$$

The $\tau_{sync}$ may be set as follows, where $\alpha$ is determined to satisfy the synchronization requirement at nominal noise levels:

$$\tau_{sync} = \frac{\alpha}{H}$$

The drift experienced by a collection of spatially separated clocks, as determined by the CIB, may depend on the local acceleration of the clock of each timing controller. Clocks on a non-rigid vehicle, or a vehicle rotating in a gravitational field, may have a portion of their drift attributable to the differential acceleration or rotation of the vehicle. The majority of this acceleration-dependent drift is attributable to mechanical properties of the clocks, but some of the clock drift is attributable to relativity. The synchronization table stored by the CIB may have entries that contain information about the vehicle rotation and position, or pose, at the time the synchronization table was computed. In particular embodiments, the camera synchronization table entries may be used as a data source for the inertial estimation and navigation of the vehicle, as a performance improvement over using purpose-built inertial measurement units such as accelerometers and gyroscopes.

Figure 5:
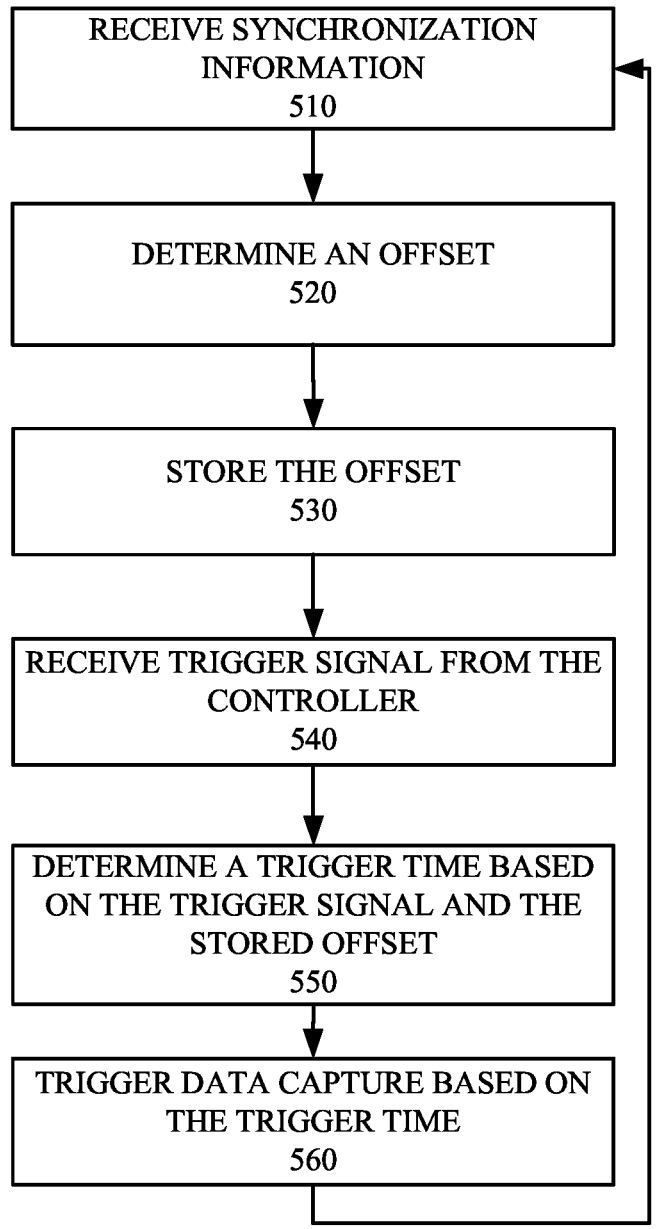
FIG. 5 illustrates an example method for synchronizing a data capture by a sensor.

FIG. 5 illustrates a method for synchronizing data capture between sensors (e.g., optical cameras, infrared cameras, inertial measurement units, LiDAR, etc.). The method 500 may begin at step 510, where a computing device of a first sensor may receive synchronization information from a controller (e.g., CIB). The synchronization information may be generated based on a clock of the controller, which is different from the clocks of the sensors. As previously described, the synchronization information may be a number of pulses with an interval that corresponds to a counter incrementation of the clock of the controller. In other embodiments, the synchronization information may be a code (e.g., k-indexed binary signal).

At step 520, the computing device of the first sensor may determine, based on the synchronization information, a first offset between a first clock of the first sensor and the clock of the controller. The first offset may be a frequency offset and a phase offset between the first clock of the first sensor and the clock of the controller. In an embodiment where the synchronization information is a number of pulses, the first offset may be determined based on a measurement of the number of pulses using the first clock of the first sensor. In an embodiment where the synchronization information is a code, the computing device of the first sensor may compare the code to a plurality of transformed versions of an expected code and determine which one of the plurality of transformed versions of the expected code corresponds to the code. The first offset may then be determined based on a transformation associated with that transformed version of the expected code.

In particular embodiments, each sensor, in response to receiving the synchronization information from the controller, may transmit the received synchronization information to the controller. The controller may then use the round-trip time of the synchronization information to estimate and compensate for an average transmission delay. For example, later when the controller sends trigger signals that indicate a scheduled time(s) for triggering capture, the scheduled time(s) may be selected by the controller based on the measured round-trip time or the average transmission delay computed therefrom. Doing so helps ensure that the trigger signals are received by their intended recipient sensors prior to the scheduled trigger times.

At step 530, the computing device of the first sensor may store the first offset. For example, the first offset may be stored in an entry $S_{ij}$ of a local synchronization table, as described in more detail above. The stored offset will help the first sensor convert any timing information generated relative to the controller's clock to be relative to the first clock of the first sensor. Once the conversion is made, the first sensor may rely on its own clock to determine whether it is time to perform a data capture.

At step 540, the computing device of the first sensor may receive, from the controller, a first trigger signal for triggering data capture, the first trigger signal being generated based on the clock of the controller. The first trigger signal may specify a scheduled time (or multiple scheduled times) at which to trigger data capture.

At step 550, the computing device of the first sensor may determine, based on the first trigger signal and the stored first offset, a first trigger time relative to the first clock of the first senor. For example, the computing device of the first sensor may retrieve from its synchronization table the relevant offset associated with the source of the first trigger signal, which in this example would be the controller. The retrieved first offset, which may be a frequency and phase offset, may be applied to the first trigger signal to determine what the trigger time should be relative to the first sensor's local clock.

At step 560, the computing device of the first sensor may trigger the first sensor to perform a first data capture based on the first trigger time and the first clock of the first sensor. The first data capture is synchronized with a second data capture by a second sensor (or any additional number of sensors). The second sensor and any additional sensors synchronized with the first sensor may each determine its own clock offset relative to the clock of the controller, similar to the process described above with reference to the first sensor. For example, the second data sensor may similarly receive synchronization information from the controller and use it to determine a second offset between a second clock of the second sensor and the clock of the controller. The second offset may be stored in the second sensor's synchronization table. In particular embodiments, both the first sensor and the second sensor may transmit their respective first and second offsets to the controller for storage. Since the second offset is independently determined by the second sensor, the second offset and the first offset determined by the first sensor may be the same or different. Thereafter, the second sensor may receive a second trigger signal from the controller that corresponds to the first trigger signal received by the first controller (e.g., both the first and second trigger signals may specify the same desired trigger time relative to the clock of the controller). The second sensor may determine a second trigger time based on the second trigger signal and the second offset stored by the second sensor. The second sensor may then perform a second data capture at the second trigger time relative to a second clock of the second sensor.

As described in further detail above, the first sensor may periodically update the offsets within its synchronization table so that they remain valid (the coherence time). The time between updates may be set to be smaller than the coherence time. Continuing with the example above, after the first data capture is performed, the first sensor may receive a second synchronization information from the controller. Again, the first sensor may determine, based on the second synchronization information, another offset between the first clock of the first sensor and the clock of the controller. The first sensor may then replace the previously-stored first offset with the third offset. Other sensors synchronized with the controller may similarly update their respective synchronization tables.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for synchronizing a data capture by a sensor including the particular steps of the method of FIG. 5, this disclosure contemplates any suitable method for synchronizing a data capture by a sensor including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
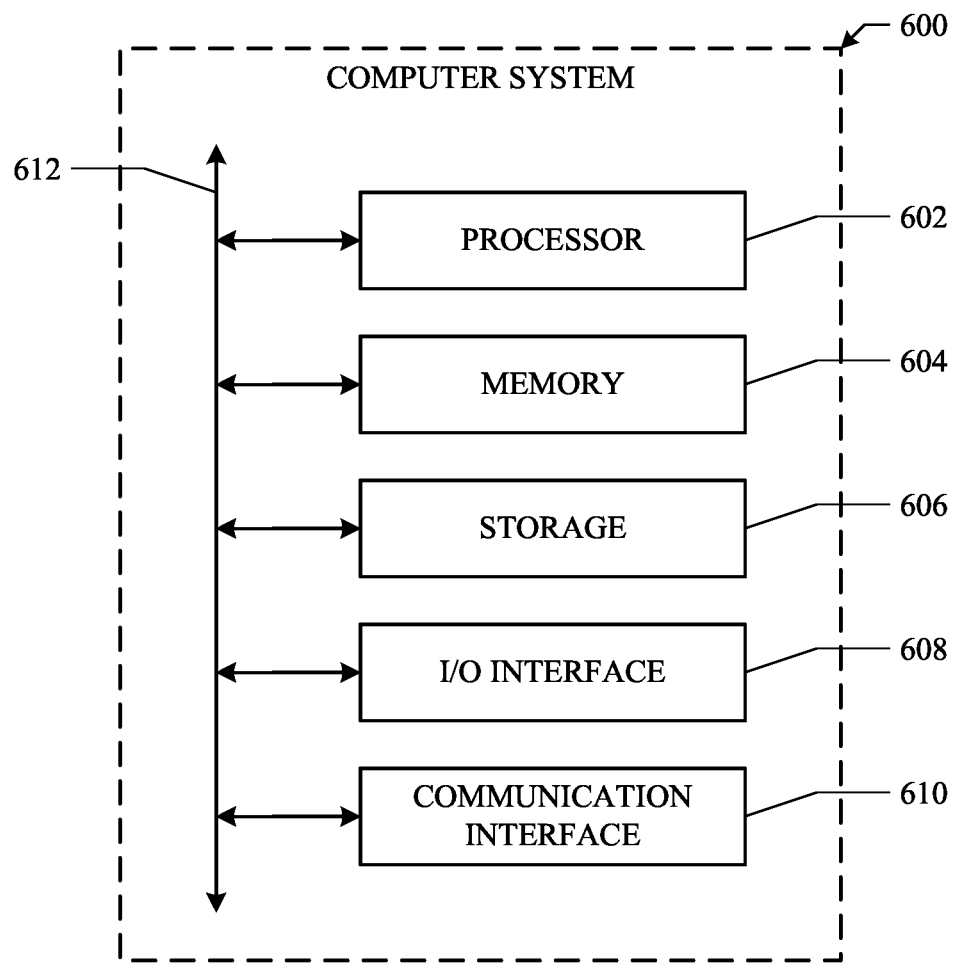
FIG. 6 illustrates an example of a computing system.

FIG. 6 illustrates an example computer system. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described in further detail below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by
one or more processors of a first sensor associated with a vehicle:
receiving synchronization information from a timing controller, the synchronization information being generated based on a clock of the timing controller;
determining, based on the synchronization information, a first offset between a first clock of the first sensor and the clock of the timing controller;
calculating, based on the first offset, one or more entries for inclusion in a synchronization table, wherein the synchronization table is configured to convert timing information generated relative to the clock of the timing controller to first timing information associated with the first clock of the first sensor; and
updating the synchronization table based on the one or more entries.

2. The method of claim 1, wherein receiving synchronization information from the timing controller comprises receiving a periodic pulse train on one or more channels utilized to transmit synchronization information from the timing controller to the first sensor.

3. The method of claim 2, wherein the periodic pulse train comprises a periodic series including a predetermined N number of pulses.

4. The method of claim 3, further comprising calculating the one or more entries for inclusion in the synchronization table by determining a duration and an interval between each of the predetermined N number of pulses.

5. The method of claim 1, further comprising calculating the one or more entries based on:
(1) a quotient of a local timing value and a predetermined fixed incrementation of a counter of the clock of the timing controller; and
(2) a quotient of an expected pulse length and a timed pulse length received at the first sensor.

6. The method of claim 1, wherein the first offset comprises a frequency offset and a phase offset between the first clock of the first sensor and the clock of the timing controller.

7. The method of claim 1, wherein receiving synchronization information from the timing controller comprises receiving a coded-pulse train on one or more channels utilized to asynchronously transmit synchronization information from the timing controller to the first sensor.

8. The method of claim 1, further comprising performing, based on the first offset and the first timing information, a first data capture by the first sensor synchronized with a second data capture by a second sensor.

9. The method of claim 1, wherein the first sensor is disposed on the vehicle.

10. A non-transitory computer-readable medium comprising instructions that, when executed by one or more processors of a first sensor associated with a vehicle, cause the one or more processors to:
receive synchronization information from a timing controller, the synchronization information being generated based on a clock of the timing controller;
determine, based on the synchronization information, a first offset between a first clock of the first sensor and the clock of the timing controller;
calculate, based on the first offset, one or more entries for inclusion in a synchronization table, wherein the synchronization table is configured to convert timing information generated relative to the clock of the timing controller to first timing information associated with the first clock of the first sensor; and
update the synchronization table based on the one or more entries.

11. The non-transitory computer-readable medium of claim 10, wherein the instructions to receive synchronization information from the timing controller further comprises instructions to receive a periodic pulse train on one or more channels utilized to transmit synchronization information from the timing controller to the first sensor.

12. The non-transitory computer-readable medium of claim 11, wherein the periodic pulse train comprises a periodic series including a predetermined N number of pulses.

13. The non-transitory computer-readable medium of claim 12, further comprising instructions to calculate the one or more entries for inclusion in the synchronization table by determining a duration and an interval between each of the predetermined N number of pulses.

14. The non-transitory computer-readable medium of claim 10, wherein the instructions to calculate the one or more entries further comprises instructions to calculate the one or more entries based on:
(1) a quotient of a local timing value and a predetermined fixed incrementation of a counter of the clock of the timing controller; and
(2) a quotient of an expected pulse length and a timed pulse length received at the first sensor.

15. The non-transitory computer-readable medium of claim 10, wherein the first offset comprises a frequency offset and a phase offset between the first clock of the first sensor and the clock of the timing controller.

16. The non-transitory computer-readable medium of claim 10, wherein the instructions to receive synchronization information from the timing controller further comprises instructions to receive a coded-pulse train on one or more channels utilized to asynchronously transmit synchronization information from the timing controller to the first sensor.

17. A system associated with a vehicle, comprising:
a first sensor;
a timing controller;
one or more non-transitory computer-readable storage media including instructions; and
one or more processors coupled to the one or more non-transitory computer-readable storage media, the one or more processors configured to execute the instructions to:
receive synchronization information from a timing controller, the synchronization information being generated based on a clock of the timing controller;

determine, based on the synchronization information, a first offset between a first clock of the first sensor and the clock of the timing controller;

calculate, based on the first offset, one or more entries for inclusion in a synchronization table, wherein the synchronization table is configured to convert timing information generated relative to the clock of the timing controller to first timing information associated with the first clock of the first sensor; and update the synchronization table based on the one or more entries.

18. The system of claim 17, wherein the instructions to receive synchronization information from the timing controller further comprises instructions to receive a periodic pulse train on one or more channels utilized to transmit synchronization information from the timing controller to the first sensor.

19. The system of claim 18, wherein the periodic pulse train comprises a periodic series including a predetermined N number of pulses.

20. The system of claim 19, further comprising instructions to calculate the one or more entries for inclusion in the synchronization table by determining a duration and an interval between each of the predetermined N number of pulses.

* * * * *